United States Patent
Wang

(10) Patent No.: US 7,480,420 B2
(45) Date of Patent: Jan. 20, 2009

(54) METHOD FOR RECOGNIZING ABNORMAL IMAGE

(75) Inventor: Kuo-Jeng Wang, Kaohsiung (TW)

(73) Assignee: Transpacific IP, Ltd., Taipei (TW)

( * ) Notice: Subject to any disclaimer, the term of this patent is extended or adjusted under 35 U.S.C. 154(b) by 534 days.

(21) Appl. No.: 10/233,597

(22) Filed: Sep. 4, 2002

(65) Prior Publication Data

US 2004/0131253 A1 Jul. 8, 2004

(51) Int. Cl.
*G06K 9/00* (2006.01)
(52) U.S. Cl. .................................... 382/274
(58) Field of Classification Search ................ 382/112
See application file for complete search history.

(56) References Cited

U.S. PATENT DOCUMENTS

| | | | | |
|---|---|---|---|---|
| 4,442,544 | A * | 4/1984 | Moreland et al. | 382/273 |
| 5,883,971 | A * | 3/1999 | Bolle et al. | 382/124 |
| 5,963,654 | A * | 10/1999 | Prakash et al. | 382/112 |
| 6,493,468 | B1 * | 12/2002 | Matsuura | 382/274 |

* cited by examiner

Primary Examiner—Matthew C. Bella
Assistant Examiner—Alex Liew
(74) Attorney, Agent, or Firm—Stolowitz Ford Cowger LLP

(57) ABSTRACT

A method for recognizing abnormal image is disclosed. The invention utilizes level comparisons of adjacent image lines to determine if there is any abnormal image amid an image picture and whether the abnormal image belongs to shading or LBB. The method comprises the following steps. First of all, two adjacent image lines having level values $P_i$ and $P_{i-1}$ are selected. Then an absolute value of the $P_i$ and the $P_{i-1}$ is calculated. Next the absolute value is compared with a value X. When the absolute value is smaller than X, then the image lines are determined as normal. On the contrary, when the absolute value is larger than X, then at least one of the image lines is determined as abnormal. Moreover, another two image lines having level values $P_{i+1}$ and $P_{i-2}$ separately adjacent the image lines having level values $P_i$ and the $P_{i-1}$ are selected. An absolute value of the $P_{i+1}$ and the $P_{i-2}$ is calculated and the absolute value of the $P_{i+1}$ and the $P_{i-2}$ is compared to the value X. When the absolute value of the $P_{i+1}$ and the $P_{i-2}$ is smaller than X, then the image lines having level values $P_i$ and $P_{i-1}$ are determined as shading. However, when the absolute value of the $P_{i+1}$ and the $P_{i-2}$ is larger than X, then the image lines having level values $P_i$, $P_{i-1}$, $P_{i+1}$ and $P_{i-2}$ are determined as LBB.

32 Claims, 3 Drawing Sheets

METHOD FOR RECOGNIZING ABNORMAL IMAGE

BACKGROUND OF THE INVENTION

1. Field of the Invention

The present invention relates to a method for recognizing an abnormal image, and more particularly to a method for recognizing an abnormal image which is generated by LBB or shading.

2. Description of the Related Art

Optical scanners are used to capture and digitize images. For example, an optical scanner can be used to capture the image of printed matter on a sheet of paper. The digitized image can then be electronically stored and/or processed with character recognition software to produce ASCII text. The typical optical scanner includes a light source, a linear array of photoelectric sensing elements (generally a CCD sensor or a CMOS sensor, or a CIS sensor), an analog amplifier, an analog to digital converter (ADC), a controller and a random access memory (RAM).

The CCD sensor includes a large number (e.g., 2000) of photoelectric sensing elements arranged in a linear array. Each photoelectric sensing element will capture light representing a single pixel of the image. The array will capture a line of pixels. By moving the CCD sensor across a document, the entire document can be scanned one line at a time.

The conversion into digital signals of light reflected from or transmitted through the document takes place in essentially three steps. First, each photoelectric sensing element will convert the light which it receives into an electric charge. The magnitude of the charge will depend on the intensity of the light and the exposure time. Second, the charges from each of the photoelectric sensing elements are converted into analog voltages via the analog amplifier. Finally, the analog voltages are digitized by the analog to digital converter for digital image processing and storage in the RAM.

As shown in FIG. 1, a conventional image scanner is shown. A light beam is emitted from a light source 102 and reflected by a reflector 104. The light beam then exposes a document sheet 112 and is reflected by the document sheet 112. The reflected light beam then is reflected sequentially by mirrors 106a and 106b. The image of the document sheet 112 carried by the light beam is transmitted to charge-coupled devices 110 through a lens 108. Under perfect circumstance, the image of a document sheet should not present dark lines or bands in a bright field as well as bright lines or bands in a dark field. As shown in FIG. 2, a dark band 202 and several dark lines 206 show up a bright field 202. The width of the dark band 204 is larger than a pixel and the dark band 204 is called LBB. The dark line 206 having a width equal to a pixel is called shading. LBB is usually induced from obstacles in the transmitting path of the light beam between the charge-coupled devices 110 and the light source 102. The obstacles could be, for example, some dust on the mirrors 106a and 106b or the lens 108. Shading is usually caused by bad pixels (CCD) in the charge-coupled devices 110. It is therefore that the reasons separately causing LBB and shading are extremely different since one relates to malfunction of devices and the other dose not. Accordingly, it is important for an operator or a manufacturer of an image scanner to recognize and tell LBB from shading or vice versa since individual maintenance level needed is contrary. It is desirable to provide a method for recognizing abnormal image which is generated by LBB or shading so as to render an operator or a manufacturer of an image scanner easier to restore normal functions of the image scanner.

SUMMARY OF THE INVENTION

It is therefore an object of the invention to provide a method for recognizing an abnormal image so as to render an operator or a manufacturer of an image scanner easier to tell LBB from shading and restore normal functions of the image scanner.

It is another object of this invention to provide an automatic bad image identification process to render an operator or a manufacturer of an image scanner more efficient to trouble-shoot bad images.

It is a further object of this invention to provide a convenient and low-cost process to detect image faults.

To achieve these objects, and in accordance with the purpose of the invention, the invention provide a method for recognizing an abnormal image, the method comprises the following steps. First of all, two adjacent image lines having level values $P_i$ and $P_{i-1}$ are selected. Then an absolute value of the $P_i$ and the $P_{i-1}$ is calculated. Next the absolute value is compared with a value X. When the absolute value is smaller than X, then the image lines are determined as normal. On the contrary, when the absolute value is larger than X, then at least one of the image lines is determined as abnormal. Moreover, another two image lines having level values $P_{i+1}$ and $P_{i-2}$ separately adjacent the image lines having level values $P_i$ and the $P_{i-1}$ are selected. An absolute value of the $P_{i+1}$ and the $P_{i-2}$ is calculated and the absolute value of the $P_{i+1}$ and the $P_{i-2}$ is compared to the value X. When the absolute value of the $P_{i+1}$ and the $P_{i-2}$ is smaller than X, then the image lines having level values $P_i$ and $P_{i-1}$ are determined as shading. However, when the absolute value of the $P_{i+1}$ and the $P_{i-2}$ is larger than X, then the image lines having level values $P_i$, $P_{i-1}$, $P_{i+1}$ and $P_{i-2}$ are determined as LBB.

It is to be understood that both the foregoing general description and the following detailed description are exemplary and explanatory only and are not restrictive of the invention, as claimed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

It is to be understood and appreciated that the method for recognizing an abnormal image described below do not cover a complete system and method. The present invention can be practiced in conjunction with various software and hardware that are used in the art, and only so much of the commonly practiced components and steps are included herein as are necessary to provide an understanding of the present invention.

The present invention will be described in detail with reference to the accompanying drawings. It should be noted that the drawings are in greatly simplified form.

Figure 1:
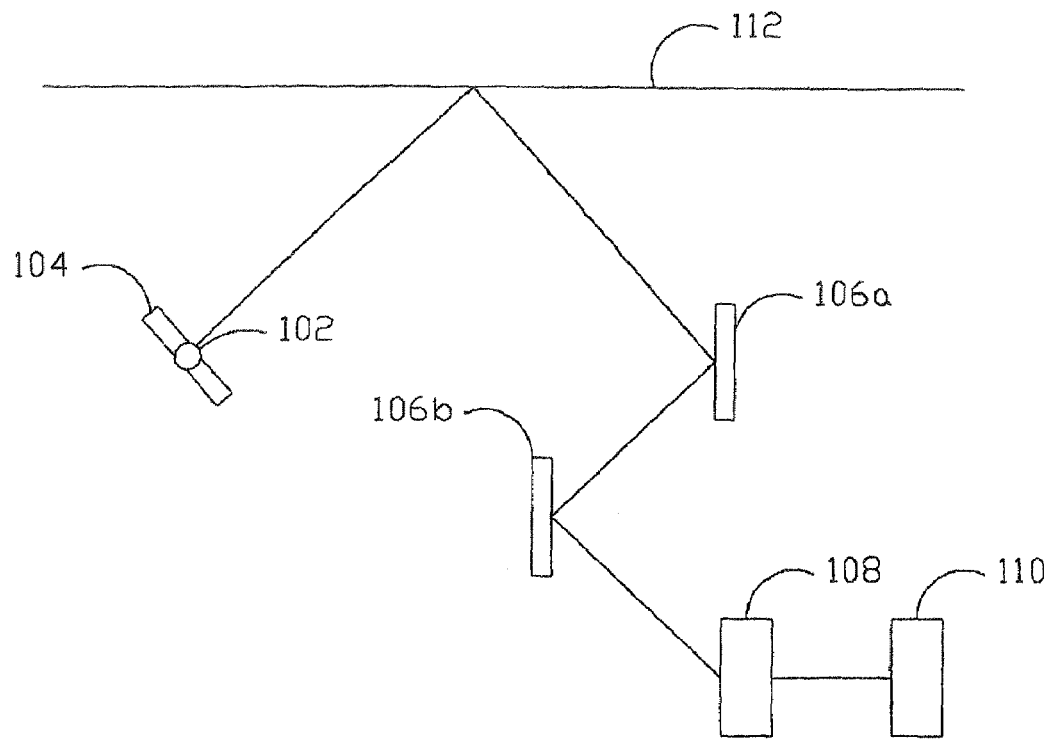
FIG. 1 shows a conventional image scanner.
Figure 2:
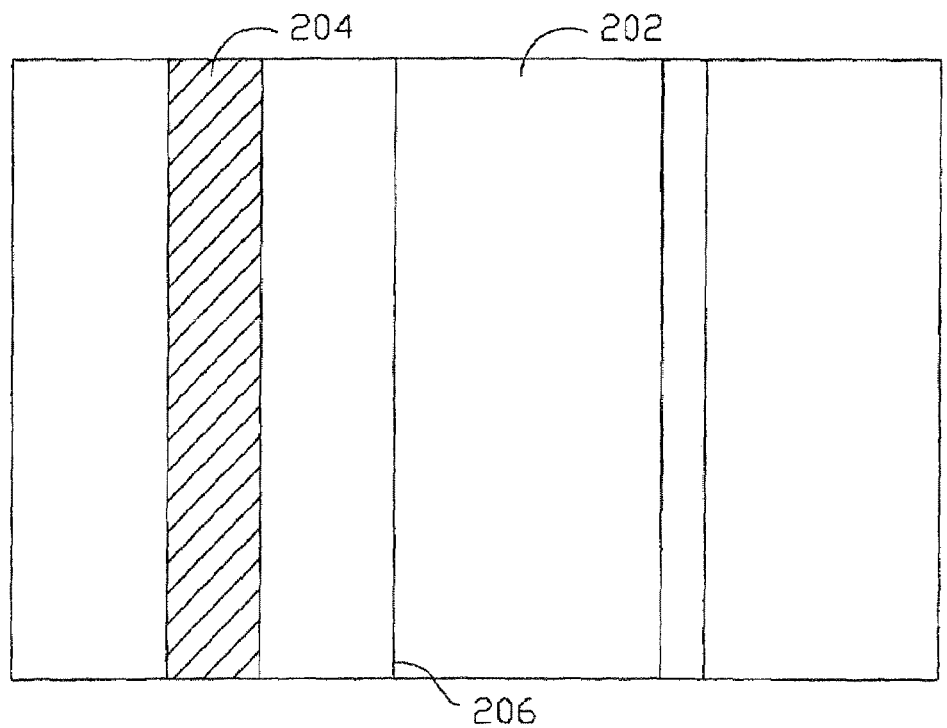
FIG. 2 shows a dark band and several dark lines on a bright field.
Figure 3:
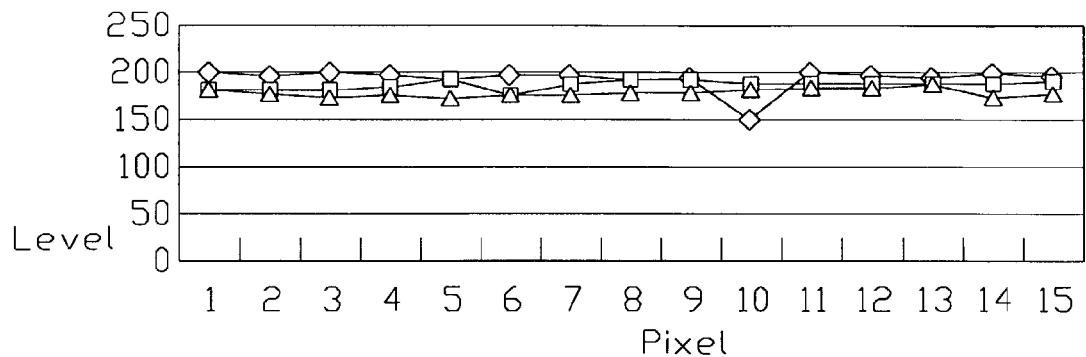
FIG. 3 shows a diagram of bright level versus pixel showing shading.
Figure 4:
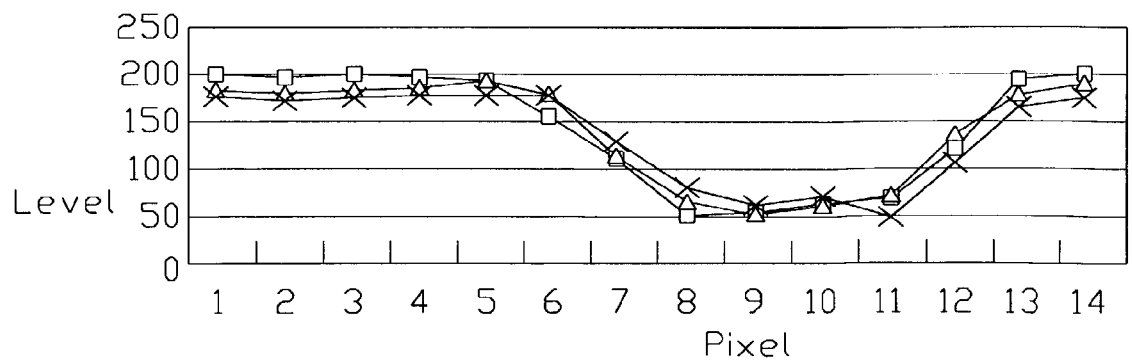
FIG. 4 shows a diagram of bright level versus pixel showing LBB.

Referring to FIG. 3, a diagram of bright level versus pixel showing shading is shown. The diagram is made by scanning a blank sheet. As shown in FIG. 3, the red light level of image line at pixel 10 is lower than the green light level and blue light level. The most likely reason of shading is malfunction of CCD array which is used to receive red light at pixel 10. FIG. 4 shows a diagram of bright level versus pixel showing LBB. This diagram is also made by scanning a blank sheet. As shown in FIG. 4, the red, green and blue light levels of image lines at pixels 6-12 are abnormal and lower. LBB is possibly caused by foreign obstacles and rarely induced by inside malfunctions of an image scanner.

Figure 5:
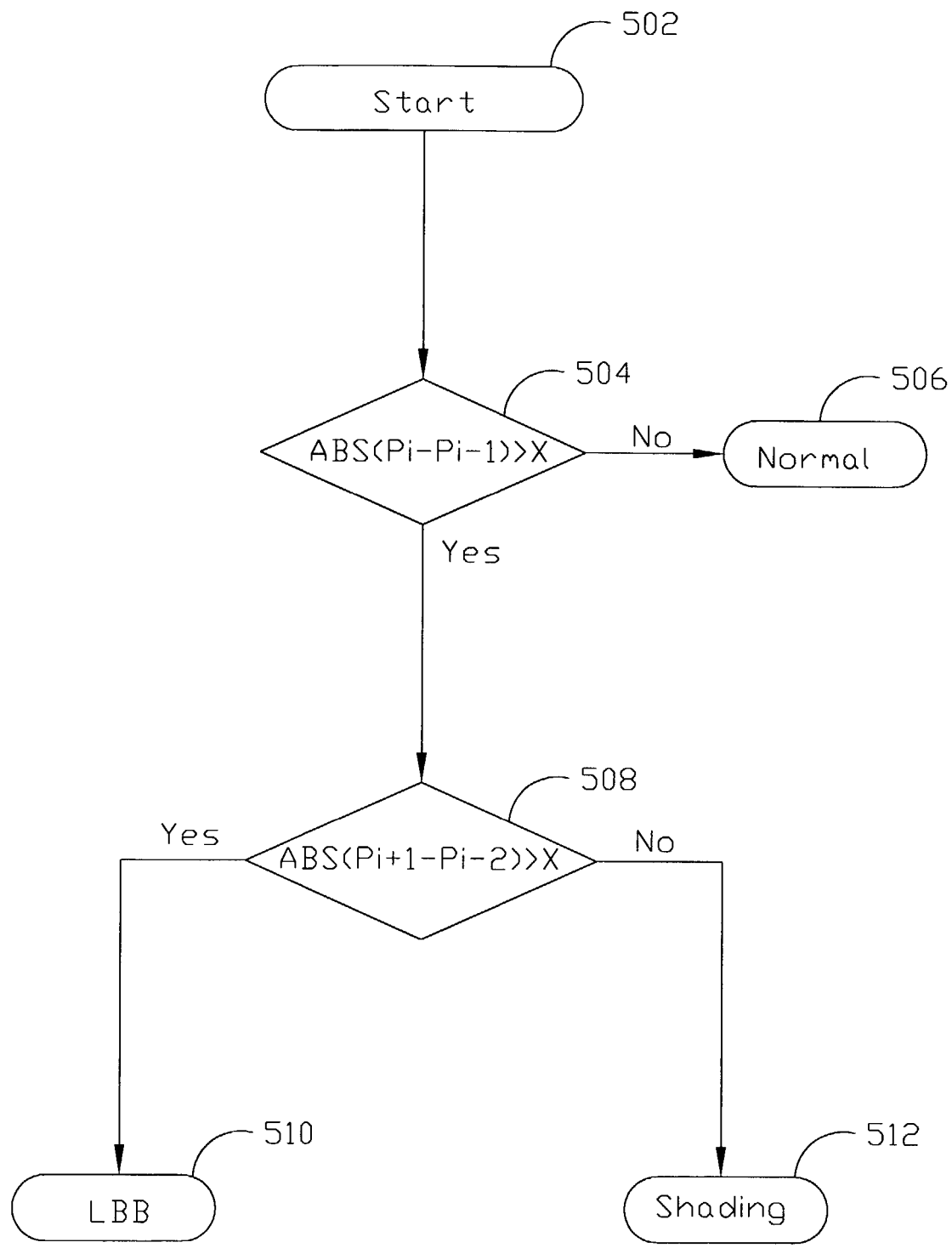
FIG. 5 shows a flow chart of this invention.

Referring to FIG. 5, a flow chart of this invention is shown. The method for recognizing whether an abnormal image is generated by LBB or shading starts in step 502. In step 504, any two image lines having significant bright level difference are selected and an absolute value of the bright level difference is computed. If the absolute value of the bright level difference is smaller than a predetermined value X, then the bright level difference is ignored and these two image lines are treated as normal. For example, if image line i has a bright level $P_i$=200, image line i−1 adjacent to image line i has a bright level $P_{i-1}$ =201 and X=3, then ABS $(P_i-P_{i-1})$<X or |200−201|=1<3 and image lines i and i−1 are determined as normal. On the contrary, if the bright level difference of selected two adjacent image lines i and i−1 is larger than X or ABS $(P_1-P_{i-1})$>X, then at least one of the image lines i and i−1 is determined as abnormal. To determine whether the abnormal image is generated by LBB or shading, another two image lines i−2 and i+1 adjacent to image lines i−1 and i, respectively, are selected and the absolute value of the bright level difference is determined in step 508. For example, if image line i has a bright level $P_i$=200, image line i−1 adjacent to image line i has a bright level $P_{i-1}$=204 and X=3, then ABS $(P_i-P_{i-1})$, >X or |200−204|=4>3. If image line i+1 next to image line i has a bright level $P_{i+1}$=200, image line i−2 adjacent image line i−1 has a bright level $P_{i-2}$=202, then ABS $(P_i-P_{i-2})$<X or |200−202|=2 <3 and the level difference of image line i and image line i−1 is determined as shading in step 512. If, instead, image line i+1 has a bright level $P_{i+1}$=200, image line i−2 has a bright level $P_{i-2}$=205, then ABS $(P_{i+1}-P_{i-2})$>X or |200−205|=5>3 and the level difference of image line i and image line i−1 together with the level difference of image line i+1 and image line i−2 are determined as LBB in step 510.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claim is:

1. A method comprising:
   selecting two adjacent image line, using a processor, each line representing a plurality of pixels, the image lines having respective level values $P_i$ and $P_{i-1}$, the values $P_i$ and $P_{i-1}$ each representing the brightness level of the pixels represented by a corresponding one of the image lines;
   calculating an absolute value of a difference between said values $P_i$ and $P_{1-1}$;
   comparing said absolute value of the difference between said values $P_i$ and $P_{i-1}$ to a value X, wherein if said absolute value of the difference between said values $P_i$ and $P_{i-1}$ is smaller than said value X, said two adjacent image lines are determined as normal, and wherein if said absolute value of the difference between said values $P_i$ and $P_{i-1}$ is larger than said value X, said two adjacent image lines are determined as abnormal;
   if said absolute value of the difference between said values $P_i$ and $P_{i-1}$ is larger than said value X, selecting an image line having a level value $P_{i+1}$ adjacent to said image line having the level value $P_i$ and further selecting an image line having a level value $P_{i-2}$ adjacent to said image line having the level value $P_{i-1}$, each of the newly selected image lines representing a plurality of pixels, the values $P_{i+1}$ and $P_{i-2}$ of the newly selected image lines each representing the brightness level of the pixels represented by a corresponding one of the newly selected image lines;
   calculating an absolute value of a difference between said values $P_{i+1}$ and $P_{i-2}$; and
   comparing said absolute value of the difference between said values $P_{i+1}$ and $P_{i-2}$ to said value X.

2. The method according to claim 1, further comprising:
   if said absolute value of the difference between said values $P_{i+1}$ and $P_{i-2}$ is smaller than said value X, recognizing a shading abnormality for said image lines having level values $P_i$ and $P_{i-1}$.

3. The method according to claim 1, further comprising:
   if said absolute value of the difference between said values $P_{i+1}$ and $P_{i-2}$ is larger than said value X, recognizing a dark band abnormality for said image lines having level values $P_i$, $P_{i-1}$, $P_{i+1}$ and $P_{i-2}$.

4. An apparatus, comprising:
   a light source to illuminate an object to be scanned with light;
   a component to convert at least a portion of light reflected from the object into a plurality of scan lines; and
   circuitry configured to:
   select two adjacent image lines having respective level values $P_i$ and $P_{i-1}$, each of the values $P_i$, and $P_{i-1}$ representing the brightness of a plurality of pixels represented by a corresponding one of the image lines;
   determine a difference between said values $P_i$ and $P_{i-1}$;
   compare said difference between said values $P_i$ and $P_{i-1}$ to a first threshold value;
   according to whether said difference exceeds the first threshold value, select an image line having a level value $P_{i+1}$ adjacent to said image line having the level value $P_i$ and further select an image line having a level value $P_{i-2}$ adjacent to said image line having the level value $P_{i-1}$, each of the values $P_{i+1}$ and $P_{i-2}$ representing the brightness of a plurality of pixels represented by a corresponding one of the image lines;
   determine a difference between said values $P_{i+1}$ and $P_{i-2}$; and
   compare said difference between said values $P_{i+1}$ and $P_{i-2}$ to a second threshold value.

5. The apparatus according to claim 4, wherein the circuitry is further operable to, if said difference between said values $P_i$ and $P_{i-1}$ does not exceed said first threshold value, recognize no abnormality for said image lines having level values $P_i$ and $P_{i-1}$.

6. The apparatus according to claim 4, wherein the circuitry is further operable to, if said difference between said values $P_1$ and $P_{i-1}$ exceeds said first threshold value, recognize an abnormality for said two image lines having level values $P_i$ and $P_{i-1}$.

7. The apparatus according to claim 4, wherein the circuitry is further operable to, if said difference between said values $P_{i+1}$ and $P_{i-2}$ does not exceed said second threshold value, recognize a shading abnormality for said image lines having level values $P_1$ and $P_{i-1}$.

8. The apparatus according to claim 4, wherein the circuitry is further operable to, if said absolute value of the difference between said values $P_{i+1}$ and $P_{i-2}$ exceeds said second threshold value, recognize a dark band abnormality for said image lines having level values $P_i$ $P_{i-1}$, $P_{i+1}$ and $P_{i-2}$.

9. A method comprising:
selecting two adjacent image lines having respective level values $P_i$ and $P_{i-1}$, using a processor, the values $P_i$ and $P_{i-1}$ each representing the brightness of a plurality of pixels represented by a corresponding one of the image lines;
calculating a difference between said values $P_i$ and $P_{i-1}$;
comparing said difference between said values $P_i$ and $P_{i-1}$ to a first threshold value;
if said difference between said values $P_i$ and $P_{i-1}$ is larger than said first threshold value, selecting an image line having a level value $P_{i+1}$ adjacent to said image line having the level value $P_i$ and further selecting an image line having a level value $P_{i-2}$ adjacent to said image line having the level value $P_{i-1}$, each of the values $P_{i+1}$ and $P_{i+2}$ representing the brightness of a plurality of pixels represented by a corresponding one of the image lines;
calculating a difference between said values $P_{i+1}$ and $P_{i-2}$; and
comparing said difference between said values $P_{i+1}$ and $P_{i-2}$ to a second threshold value.

10. The method according to claim 9, further comprising if said difference between said values $P_i$ and $P_{i-1}$ is smaller than said first threshold value, recognizing no abnormality for said two image lines having level values $P_i$ and $P_{i-1}$.

11. The method according to claim 9, further comprising if said difference between said values $P_{i+1}$ and $P_{i-2}$ is smaller than said second threshold value, recognizing a shading abnormality for said image lines having level values $P_i$ and $P_{i-1}$.

12. The method according to claim 9, further comprising if said difference between said values $P_{i+1}$ and $P_{i-2}$ is larger than said second threshold value, recognizing a dark band abnormality for said image lines having level values $P_i$, $P_{i-1}$, $P_{i+1}$ and $P_{i-2}$.

13. An article comprising: a storage medium having stored thereon instructions, that, if executed, result in:
selecting two adjacent image lines having level values $P_i$ and $P_{i-1}$, the level values each representing the brightness of a plurality of pixels represented by a corresponding one of the image lines;
determining a difference between said values $P_i$ and $P_{i-1}$;
comparing said difference between said values $P_i$ and $P_{i-1}$ to a first threshold value, wherein if said difference between said values $P_i$ and $P_{i-1}$ does not exceed said first threshold value, said two adjacent image lines are determined as normal, and wherein if said difference between said values $P_i$ and $P_{i-1}$ exceeds said first threshold value, said two adjacent image lines are determined as abnormal; and
if said difference between said values $P_i$ and $P_{i-1}$ exceeds said first threshold value, selecting an image line having a level value $P_{i+1}$ adjacent to said image line having the level value $P_i$ and further selecting an image line having a level value $P_{i-2}$ adjacent to said image line having the level value $P_{i-1}$, each of the values $P_{i+1}$ and $P_{i-2}$ representing the brightness of a plurality of pixels represented by a corresponding one of the image lines;
determining a difference between said values $P_{i+1}$ and $P_{i-2}$; and
comparing said difference between said values $P_{i+1}$ and $P_{i-2}$ to a second threshold value.

14. The article according to claim 13, further comprising:
if said difference between said values $P_{i+1}$ and $P_{i-2}$ does not exceed said second threshold value, recognizing a shading abnormality for said image lines having level values $P_i$ and $P_{i-1}$.

15. The article according to claim 13, further comprising:
if said difference between said values $P_{i+1}$ and $P_{i-2}$ exceeds said second threshold value, recognizing a dark band abnormality for said image lines having level values $P_i$, $P_{i-1}$, $P_{i+1}$ and $P_{i-2}$.

16. The apparatus of claim 4, wherein the threshold values are the same.

17. The apparatus of claim 4, wherein the circuitry is further operable to output an indication of an abnormality if the first threshold value is exceeded.

18. The method of claim 9, further comprising:
recognizing an abnormality if the first threshold is exceeded; and outputting an indication of the abnormality.

19. The method of claim 9, further comprising:
recognizing a shading abnormality if the first threshold is exceeded and the second threshold is not exceeded; and
outputting an indication of the shading abnormality.

20. The method of claim 9, further comprising:
recognizing a dark band abnormality if both the thresholds are exceeded; and
outputting an indication of the dark band abnormality.

21. The article according to claim 13, further comprising:
recognizing an abnormality if the first threshold is exceeded; and
outputting an indication of the abnormality.

22. A system, comprising:
means for comparing first brightness indications of first adjacent image lines to determine a first variance in brightness, each first brightness indication representing a plurality of pixels associated with a corresponding one of the first image lines;
means for determining whether the first variance exceeds a threshold value;
according to whether the first variance exceeds the threshold value, means for selecting second image lines that are adjacent to the first adjacent image lines;
means for comparing second brightness indications of the second image lines to determine a second variance in brightness, each second brightness indication representing a plurality of pixels associated with a corresponding one of the second image lines;
means for determining whether a scanning abnormality has occurred according to the comparisons; and
means for identifying a shading abnormality if the first variance exceeds the threshold value and the second variance does not exceed the threshold value.

23. The system of claim 22, further comprising means for identifying no abnormality if the first variance does not exceed the threshold value.

24. The system of claim 22, further comprising means for identifying a dark band abnormality if both variances exceed the threshold value.

25. The system of claim 22, wherein the brightness of the pixels accurately represents at least a portion of markings included on a scanned document if no scanning abnormality is determined.

26. The system of claim 22, wherein the second image lines are selected if the first variance exceeds the threshold value.

27. The system of claim 22, further comprising means for outputting an indication of whether the scanning abnormality has occurred.

28. An apparatus comprising:
a light source to illuminate an object to be scanned with light;
a component to convert at least a portion of the light representing the object into a plurality of scan lines; and
circuitry configured to:
analyze first brightness indications of first adjacent image lines to determine a first variance in brightness, each first brightness indication representing a plurality of pixels associated with a corresponding one of the first image lines;
according to a magnitude of the first variance, select second image lines that are adjacent to the first adjacent image lines;
analyze second brightness indications of the second image lines to determine a second variance in brightness, each second brightness indication representing a plurality of pixels associated with a corresponding one of the second image lines; and
determine whether a scanning abnormality has occurred according to the comparisons, and identify a dark band abnormality if the magnitudes exceed threshold values.

29. The system of claim 28, wherein the circuitry is further configured to identify no abnormality if the magnitude of the first variance does not exceed a respective one of the threshold values.

30. The system of claim 28, wherein the second image lines are selected if the magnitude of the first variance exceeds a respective one of the threshold values.

31. The system of claim 30, wherein the circuitry is further configured to identify a shading abnormality if a magnitude of the second variance does not exceed a respective one of the threshold values.

32. The system of claim 30, wherein the circuitry is further configured to output an indication of whether the scanning abnormality has occurred.

* * * * *

UNITED STATES PATENT AND TRADEMARK OFFICE
CERTIFICATE OF CORRECTION

PATENT NO. : 7,480,420 B2
APPLICATION NO. : 10/233597
DATED : January 20, 2009
INVENTOR(S) : Wang It is certified that error appears in the above-identified patent and that said Letters Patent is hereby corrected as shown below:

At column 3, line 53, please replace "A method comprising" with --A method, comprising--.
At column 3, line 61, please replace "1-1" with --i-1--.
At column 4, line 35, please replace "i," with --i--.
At column 4, line 60, please replace "P1 and" with --$P_i$ and--.
At column 4, line 67, please replace "P1 and" with --$P_i$ and--.
At column 5, line 5, please replace "$P_i$ $P_{i-1}$, $P_{i+1}$ and" with --$P_i$, $P_{i-1}$, $P_{i+1}$ and--.
At column 5, line 6, please replace "A method comprising" with --A method, comprising--.
At column 5, line 21, please replace "i+2" with --i-2--.
At column 7, line 1, please replace "An apparatus comprising" with --An apparatus, comprising--.

Signed and Sealed this

Eleventh Day of August, 2009

David J. Kappos
*Director of the United States Patent and Trademark Office*